Oct. 6, 1931.    L. P. MOOERS    1,826,283
BRAKE SHOE AND METHOD OF MAKING SAME
Filed Sept. 23, 1927
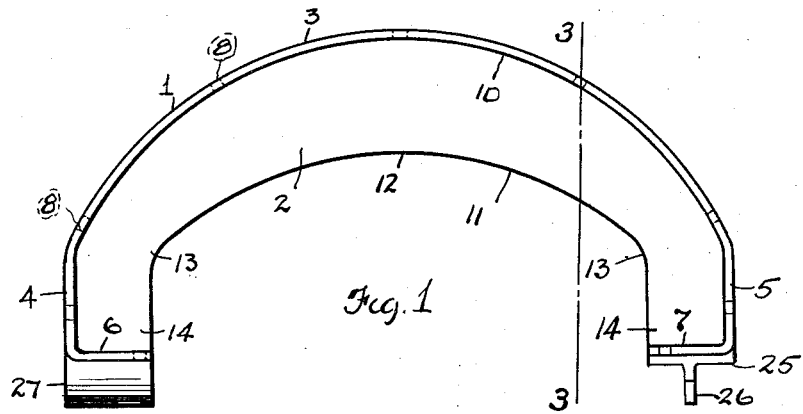
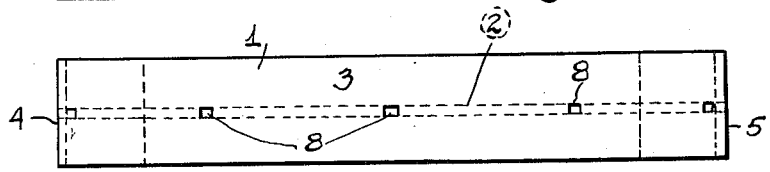
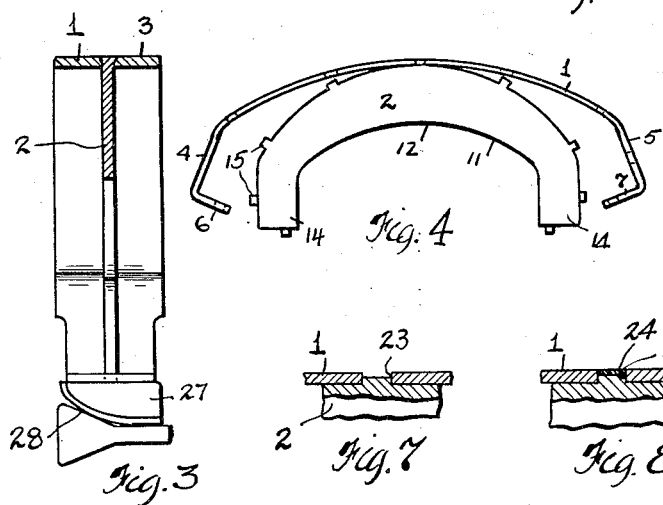
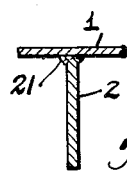
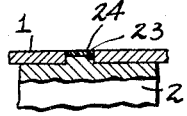
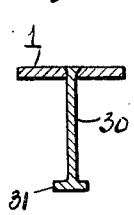
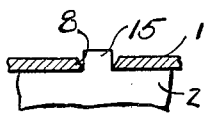
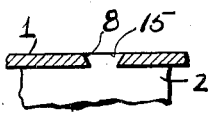
INVENTOR.
Louis P. Mooers
BY
Fay, Oberlin & Fay
ATTORNEYS.

Patented Oct. 6, 1931

1,826,283

UNITED STATES PATENT OFFICE

LOUIS P. MOOERS, OF CLEVELAND, OHIO, ASSIGNOR TO THE COLUMBIA AXLE COMPANY, OF CLEVELAND, OHIO, A CORPORATION OF OHIO

BRAKE SHOE AND METHOD OF MAKING SAME

Application filed September 23, 1927. Serial No. 221,456.

The present invention, relating as indicated to brake shoes, is particularly directed to an improved brake shoe formed of relatively light sheet metal and to a new, simple and economical method of making same.

To the accomplishment of the foregoing and related ends, said invention, then, consists of the means hereinafter fully described and particularly pointed out in the claim; the annexed drawings and the following description setting forth in detail one method and one product exemplifying my invention, such disclosed procedure and product constituting, however, but one of the various applications of the principle of my invention.

In said annexed drawings:—

Fig. 1 is a side elevation of my improved shoe; Fig. 2 is a plan view of the same; Fig. 3 is a section on the line 3—3, Fig. 1; Fig. 4 is a side elevation showing the method of assembly of the two parts which constitute the shoe; Fig. 5 is a transverse section showing a second method of assembly; Fig. 6 is a similar view showing the elements of Fig. 5 after assembly; Fig. 7 is a fragmentary longitudinal central section showing the method of engagement between the parts in the method of assembly shown in Fig. 4; Fig. 8 is a view similar to Fig. 7 after the completed union between the two parts; Fig. 9 is a longitudinal section showing the initial assembly of engagement parts of a modification of the construction shown in Figs. 7 and 8; Fig. 10 is a similar view showing the full engagement between these parts; and Fig. 11 is a transverse section of a modification of the shoe construction.

Brake shoes formed of sheet metal can be used to considerable advantage in the braking systems of automotive vehicles by reason of their light weight and high strength, provided they can be formed readily and can be made sufficiently rigid to prevent distortion when in operation, and particularly after they have been heated, as is the case when brakes have been applied for any considerable period. I have devised a brake shoe of extreme simplicity and a minimum of parts and a method of uniting the parts into a strong and rigid construction which is both rapid and extremely economical.

My improved shoe consists of a cylindrical plate 1 and a reinforcing plate 2 rigidly united to the plate 1 and lying in a plane at substantially right angles to that of the first plate. The plate 1 is provided with a cylindrical outer surface 3, against which suitable friction material may be applied by any of the usual methods. It is also provided with two parallel end portions 4 and 5 and with radial terminal flanges 6 and 7, while at various points, both in the cylindrical portion 1 and in the portions 4, 5, 6 and 7, openings 8 are formed during manufacture of this plate and without additional operation.

I also form an arcuate shaped plate 2 provided with a cylindrical outer surface 10 and an inner surface 11, which is generally parallel with the outer surface, but spaced a greater distance therefrom at the central point 12 than at the end portions 13 in order to provide a greater stiffening effect at the point where it is required in the center of the shoe. At various points on the ends 14 and along the outer surface 10 of the plate 2 are formed projections 15 which are formed and spaced to fit into the openings 8 which have previously been formed in the outer plate 1. I next assemble the two plates in the manner indicated in Fig. 4 with the central projections or buttons 15 in engagement with the central openings in the plate 1 and then spring the ends of the outer plate into contact with the ends of the reinforcing plate. As the outer plate is formed in this position the engaging buttons enter the openings 8 in the outer plate and the two plates may then be held in this relationship while the buttons are either upset, as shown in Figs. 9 and 10 or metal is flowed into the recess formed on top of the button in the manner indicated in Figs. 7 and 8. If the buttons shown in Figs. 9 and 10 are used and are upset to produce the engagement between the parts the sides of the opening into which the buttons are fitted may be slightly beveled as shown in Fig. 9 to provide a more secure engagement between these parts.

Another method of assembly is illustrated in Figs. 5 and 6, in which the web 2 is provided with a beveled edge portion 20 adapted to be pressed against the center of the inside surface of the plate 1 and welded thereto by resistance welding, pressure being exerted between the members during the welding to produce a flattened and broadened end 21 integrally united to the plate 1, as shown in Fig. 6.

Another method of assembly is illustrated in Figs. 7 and 8, and in the construction shown the buttons 15 are of such a height that they enter only part way into the recesses 23. When the plates are assembled with the buttons in these recesses the buttons may be welded to the walls of the recesses by arc welding, and metal 24 may then be caused to flow in on top of the head of the button to integrally unite the button to the walls of the recesses.

Any suitable end members may be secured to my improved shoe. Thus, at the right of Fig. 1 I have shown a plate 25 having a projecting portion 26 adapted to engage with a suitable adjusting pin or anchor pin for fixing that end of the brake shoe when in use. To the other end of the shoe may be secured a member 27 (see Fig. 3) provided with a curved cam surface 28, which may be engaged by an operating element moved at right angles to the plane of the brake shoe and adapted when so moved to force the shoe pivotally outward about its axis in the brake assembly. It will be understood that while I have shown the end members just described on the brake shoes, any other suitable members may be employed for adapting the particular shoe construction here shown for use with various types of operating elements.

In Fig. 11 I have shown a transverse section of a modification of the shoe construction heretofore described, the modification consisting in the reinforcing plate 30 being provided with a right-angled flange 31 along its inner edge for reinforcing and strengthening the web itself and the support given by this web to the outer plate or brake-receiving member 1.

The present brake shoe is extremely simple in construction and economical to manufacture, while it provides an extremely light and strong shoe for the reception of brake-lining material.

Other forms may be employed embodying the features of my invention instead of the one here explained, change being made in the form or construction, provided the elements stated by the following claim or the equivalent of such stated elements be employed, whether produced by my preferred method or by others embodying steps equivalent to those stated in the following claim.

I therefore particularly point out and distinctly claim as my invention:—

A pressed steel brake shoe comprising a curved band of flattened cross section and end portions rebent inwardly, and a reinforcing plate disposed at right angles to said band, said plate being confined by and held from displacement by said rebent ends.

Signed by me, this 7th day of September, 1927.

LOUIS P. MOOERS.